US012566970B2

(12) United States Patent
Hu et al.

(10) Patent No.: US 12,566,970 B2
(45) Date of Patent: Mar. 3, 2026

(54) SELF-POWERED INTEGRATED SENSING AND COMMUNICATION INTERACTIVE METHOD OF HIGH-SPEED RAILWAY BASED ON HIERARCHICAL DEEP REINFORCEMENT LEARNING

(71) Applicant: Jilin University, Changchun (CN)

(72) Inventors: Fengye Hu, Changchun (CN); Zhuang Ling, Changchun (CN); Tanda Liu, Changchun (CN); Hailong Li, Changchun (CN); Zhijun Li, Changchun (CN); Wuliji Nashun, Changchun (CN); Difei Jia, Changchun (CN); Long Lv, Changchun (CN); Qiang Li, Changchun (CN)

(73) Assignee: Jilin University, Changchun (CN)

( * ) Notice: Subject to any disclaimer, the term of this patent is extended or adjusted under 35 U.S.C. 154(b) by 744 days.

(21) Appl. No.: 18/083,586

(22) Filed: Dec. 19, 2022

(65) Prior Publication Data

US 2023/0196119 A1    Jun. 22, 2023

(30) Foreign Application Priority Data

Jul. 5, 2022    (CN) .......................... 202210792408.1

(51) Int. Cl.
| | |
|---|---|
| G06N 3/092 | (2023.01) |
| B61L 27/70 | (2022.01) |
| H04B 7/22 | (2006.01) |

(52) U.S. Cl.
CPC .............. G06N 3/092 (2023.01); B61L 27/70 (2022.01); H04B 7/22 (2013.01)

(58) Field of Classification Search
CPC .......... G06N 3/092; G06N 7/01; B61L 27/70; B61L 15/0027; B61L 15/0058;
(Continued)

(56) References Cited

U.S. PATENT DOCUMENTS

| | | | | |
|---|---|---|---|---|
| 6,208,640 B1 * | 3/2001 | Spell | ...................... | H04L 47/10 |
| | | | | 370/468 |
| 2006/0007222 A1 * | 1/2006 | Uy | ...................... | H04N 25/702 |
| | | | | 345/207 |

(Continued)

FOREIGN PATENT DOCUMENTS

| | | | | | |
|---|---|---|---|---|---|
| CN | 116432509 A | * | 7/2023 | ............. | G06F 30/27 |
| EP | 3492946 A1 | * | 6/2019 | ........... | G01S 5/0218 |
| WO | WO-2020205655 A1 | * | 10/2020 | ............. | G06N 20/00 |

*Primary Examiner* — Mahendra R Patel

(74) *Attorney, Agent, or Firm* — Hemisphere Law, PLLC

(57) ABSTRACT

The present invention provides a self-powered integrated sensing and communication (ISAC) interactive method of high-speed railway based on hierarchical deep reinforcement learning (HDRL), including: Constructing an integrated system framework for passive sensing and communication of high-speed train, where the passive sensor is mainly used for receiving train status information, and the access point (AP) is utilized for status information sensing of the train; During the remote communication between the AP and the base station (BS), Gaussian mixture model (GMM) clustering method is utilized for obtaining reference handover triggering points and completing the communication handover; Proposing an option-based HDRL algorithm to train the high-speed train agent so as to implement the dynamic autonomous switching process of information sensing and remote communication, thereby ensuring the minimum of task completion time and the timely charging for sensors. The present invention integrates passive sensing and remote communication.

9 Claims, 3 Drawing Sheets

(58) Field of Classification Search
CPC ....... H04B 7/22; Y02T 10/40; H04L 47/2475;
H04L 47/803
USPC ........................................................ 370/328
See application file for complete search history.

(56)                      References Cited

U.S. PATENT DOCUMENTS

| | | | |
|---|---|---|---|
| 2007/0229295 A1* | 10/2007 | Curt ................... | G01R 31/2829 |
| | | | 340/657 |
| 2018/0183482 A1* | 6/2018 | Rodriguez, Jr. ......... | H04Q 9/00 |
| 2020/0142406 A1* | 5/2020 | Srini ..................... | G01S 17/931 |
| 2021/0007023 A1* | 1/2021 | Umapathy ........ | H04W 36/0061 |
| 2022/0400392 A1* | 12/2022 | Ergen ................... | H04W 24/08 |

* cited by examiner

SELF-POWERED INTEGRATED SENSING AND COMMUNICATION INTERACTIVE METHOD OF HIGH-SPEED RAILWAY BASED ON HIERARCHICAL DEEP REINFORCEMENT LEARNING

TECHNICAL FIELD

The present invention relates to the technical field of high-speed railway self-powered integrated sensing and communication (ISAC) technology, and specifically to an integrated passive sensing and communication interactive method for the future smart high-speed trains based on hierarchical deep reinforcement learning (HDRL).

BACKGROUND

During the past few years, to further promote the intelligent and lightweight development of high-speed trains, applying the latest wireless techniques to develop a new generation of high-speed railway communication system has been proposed in the industry.

The rapid growth of wireless sensing devices in the process of the lightweight shift from "wired" to "wireless" of the high-speed train has brought a problem with the continuous supply of energy, which has become a bottleneck in the development of high-speed train wireless sensor networks (WSN) and limited the large-scale deployment of train sensors. Data acquisition that combines passive sensing has given rise to the application and development of passive sensors. Passive sensors do not require their own batteries, but harvest energy from the downlink radio frequency (RF) signals of the access point (AP) for their own computation and sensing, and use backscatter communication technology to transmit the sensed information to the AP. Such sensors get rid of the constraints of active devices such as batteries, reduce deployment costs and energy consumption (up to several microwatts) and support omni-directional, omni-periodic and sustainable train condition monitoring. Moreover, its longer lifespan, easier maintenance and simpler lightweight have attracted widespread attention from academia and industry.

When a high-speed train moves away from the communication coverage area of the current serving base station (BS) or unexpected communication interruption due to the highly-dynamic complex channel environment, it needs to reconnect to the nearest BS for communication. Handover can guarantee uninterrupted communication between high-speed trains and BSs, and improve the effectiveness and reliability of the communication system. The traditional handover scheme analysis is based on the received signal strength (RSS) difference between the serving BS and the target BS. However, some researchers have demonstrated that a large RSS difference may increase the probability of link failure before the handover is triggered, which will reduce handover performance. Therefore, remote communication handover has become essential in the intellectual development of high-speed railway communication systems.

At present, integrated sensing and communication (ISAC) technology refers to the integration of sensing and communication ideas at the hardware architecture and algorithm design level, so as to realize the joint design of sensing and communication. Related research mainly focuses on the Internet of Vehicles, intelligent transport system (ITS) and industrial network systems to address issues related to information fusion and resource collaboration, in order to improve the overall performance of system in terms of sensing and communication. However, the research on the joint design of intelligent sensing system in high-speed (more than 400 km/h) railway operation scenarios is still in its infancy. Focusing on the construction of a lightweight and intelligent ISAC high-speed railway network, how to integrate passive sensing with remote communication to realize the interaction of sensing and communication in high-speed dynamic mobility scenarios, has become one of the difficult problems that need to be solved in high-speed railway communication systems.

SUMMARY

Given this fact, the present invention introduces an integrated passive sensing and communication interactive method for the high-speed train based on hierarchical deep reinforcement learning (HDRL), which combines information sensing with remote communication and minimizes task completion time.

The present invention discloses a self-powered integrated sensing and communication (ISAC) interactive method of high-speed railway based on HDRL, detailed steps are as follows.

(1) Constructing an integrated system framework for passive sensing and communication of high-speed railways, which includes high-speed train carriages and base stations (BS) for communicating remotely. High-speed train carriages comprise an AP structure and a passive sensor structure. The former is mainly used for receiving train status information and communicating remotely with base stations described before. The latter functions include harvesting wireless radio frequency (RF) energy from the AP, monitoring the train running status, and sending sensed train status information to the AP.

(2) Establishing an information sensing and remote communication model, which consists of a RF energy harvesting model for passive sensors, an information sensing model for train APs, and a remote communication model between the AP and the BS. Gaussian mixture model (GMM) clustering method is utilized to divide the remote communication handover triggering area and obtain reference handover triggering points. Handover of BS that communicates with the AP occurs in these reference points during the moving of high-speed trains.

(3) Formulating the integrated optimization problem, establishing a joint optimization model with task completion time minimization as the objective function. Training the joint optimization model by applying the HDRL algorithm, so as to solve the optimal configuration of the system framework and acquire the optimal interaction policy. The task completion time includes: the time duration that passive sensors harvest energy, the time duration that the AP senses information and the time duration that the AP communicates with the remote BS. In conclusion, the joint optimization model represents the dynamic autonomous switching process of energy transmission, information sensing and remote communication of high-speed trains.

Preferably, the establishment of the nonlinear energy harvesting model for passive sensors is given.

Based on the process of the AP sending RF signals of given unit power to passive sensors with given transmission power, the energy signal model received by passive sensors is constructed.

After passive sensors receive RF signals, the RF energy is utilized to charge their own circuits. Ultimately, the nonlinear energy harvesting model for passive sensors is proposed.

The establishment of the information sensing model for training APs can be given.

After the completion of data acquisition, using backscatter communication technology, the AP can sense the information of the data collected by passive sensors and build the information sensing signal model received by the AP and the transmission rate model of the signal.

Preferably, the remote communication model between the AP and the BS is considered.

Constructing the transmission rate model of the BS when receiving signals from the AP.

Transmission rates of signals received by the BS constitute multiple Gaussian distribution hybrid vectors with given parameters, which form a Gaussian mixture model for describing the probability distribution of the reference handover triggering points and dividing the handover range of the AP and the BS communication based on the clustering results of the Gaussian mixture.

By fitting the relationship between transmission rate, train running speed and time stamps, the predictive value and corresponding distribution of the reference handover triggering points can be obtained, and the current reference handover triggering point prediction is viewed as a priori information for the next update calculation; The location of each communication handover triggering area center is determined by the mean vector of the Gaussian distribution hybrid vectors that comprised the transmission rate, and the reliability of the prediction is determined by the covariance vector of the Gaussian distribution hybrid vectors that comprised the transmission rate represented by the shape and size of the communication handover triggering area.

Preferably, the option-based HDRL algorithm applies a semi-Markov decision process (SMDP) to simulate a high-speed train sensing and communication scenario, including state sets, action sets, option sets, transition probability, total reward and reward discount factor; The high-speed train AP, as a single agent, can learn policy based on options. The AP selects an option based on its initial state at the beginning of the task and then executes the action according to the policy of the selected option. At the moment when the option ends and reaches the total reward for the selected option, the agent selects the option to be executed according to the policy based on the state information, and so on until the end of the task.

Preferably, state sets of the high-speed train AP include: remote communication connection probability, high-speed train position, remaining energy of the sensor and percentage of information sensed by the AP from the sensor; Action sets include three actions: energy transmission from the AP to the sensor, the AP information sensing and the remote communication between the AP and the BS; Similarly, option sets contains three options: information sensing, energy transmission and remote communication; The total reward of options are divided into three categories: energy remaining reward, information sensing reward and remote communication reward.

Preferably, the AP receives the total reward for each option at the end moment of that option, and the total reward is a function of the initial state of the option and the options action. More specifically, the energy remaining reward is for punishing the working condition of insufficient power during the execution of that option, the information sensing reward is used for punishing the AP for repeated selection of a passive sensor that has completed the acquisition, and the remote communication reward is used to punish the AP for repeatedly selecting a BS that has completed communication handover.

Preferably, the option-based HDRL algorithm first inputs the current state information into the option-value neural network, in which the corresponding output is the option probability; Then derives the optimal option by comparing the index of values obtained from the random selection and greedy algorithms; Finally outputs the corresponding action according to the policy and termination condition of the selected option.

Preferably, the option-value neural network of the option-based HDRL algorithm has one input layer, five hidden layers and one output layer. The input layer receives state information and option rewards, and hidden layers include five fully connected layers. Rectified Linear Unit (ReLU) is employed for all hidden layers as an activation function, and softmax normalized exponential function is employed for the output layer to obtain the option probability.

Preferably, the option-value neural network of the option-based HDRL algorithm is trained by using experience random sampling and experience replay. The update of the option-value neural network parameters is completed by computing the gradient of the loss function.

As can be seen by the above technical solutions, compared with the prior art, the beneficial effects of the present invention include the following:

The present invention creates a lightweight and intelligent integrated sensing and communication high-speed railway network that minimizes task completion time. The differences with conventional methods are as follows:

By establishing an integrated passive sensing and communication system framework of high-speed railbus, information sensing and remote communication are integrated into the same application terminal, and passive sensing and remote communication are united deeply;

The predictive value and the corresponding distribution of the reference handover triggering points can be obtained by fitting the relationship between transmission rate, train speed and time. The remote communication reference handover triggering area can be divided with the Gaussian mixture model clustering method so as to assist high-speed trains with communication handover.

An option-based HDRL algorithm is proposed for training high-speed train agents to implement data sensing and autonomous handover of remote communication, ensuring the minimum task completion time, timely charging for sensors, and obtaining the optimal interaction policy between agents and environment under the fulfilment of objective function. Ultimately, the goal is completing the dynamic autonomous handover process of energy transmission, information sensing and remote communication under minimum task completion time, reaching the interaction between sensing and communication in highly-dynamic mobility scenarios and improving the performance of ISAC.

The present invention can cope with the complex changes of high-speed railway communication scenario, while the self-powered sensing process can achieve highly reliable green communication. The present invention can be widely applied to determine the typical high-speed railway scenarios (such as viaducts, road rifts, and long tunnels), with remarkable practical application value.

DESCRIPTION OF DRAWINGS

To more clearly describe the technical solution in the embodiments of the present invention or in the prior art, the drawings required to be used in the description of the embodiments or the prior art will be simply presented below. Apparently, the drawings in the following description are merely the embodiments of the present invention, and for those ordinary skilled in the art, other drawings can also be obtained according to the provided drawings without contributing creative labor.

DETAILED DESCRIPTION

The technical solution will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Figure 1:
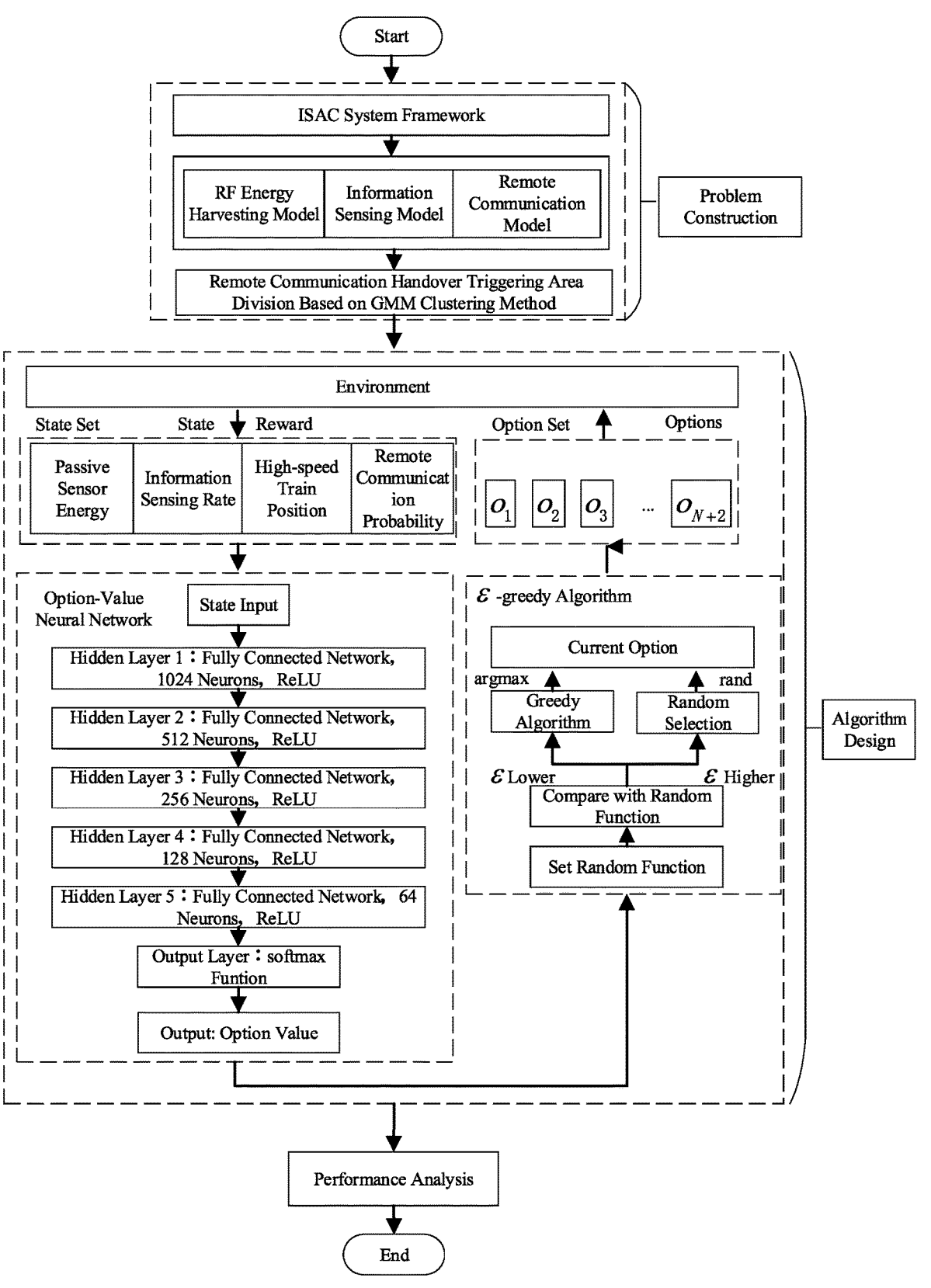
FIG. 1 is a flow chart of an integrated passive sensing and communication interactive method of the high-speed train based on HDRL provided by embodiments of the present invention.
Figure 2:
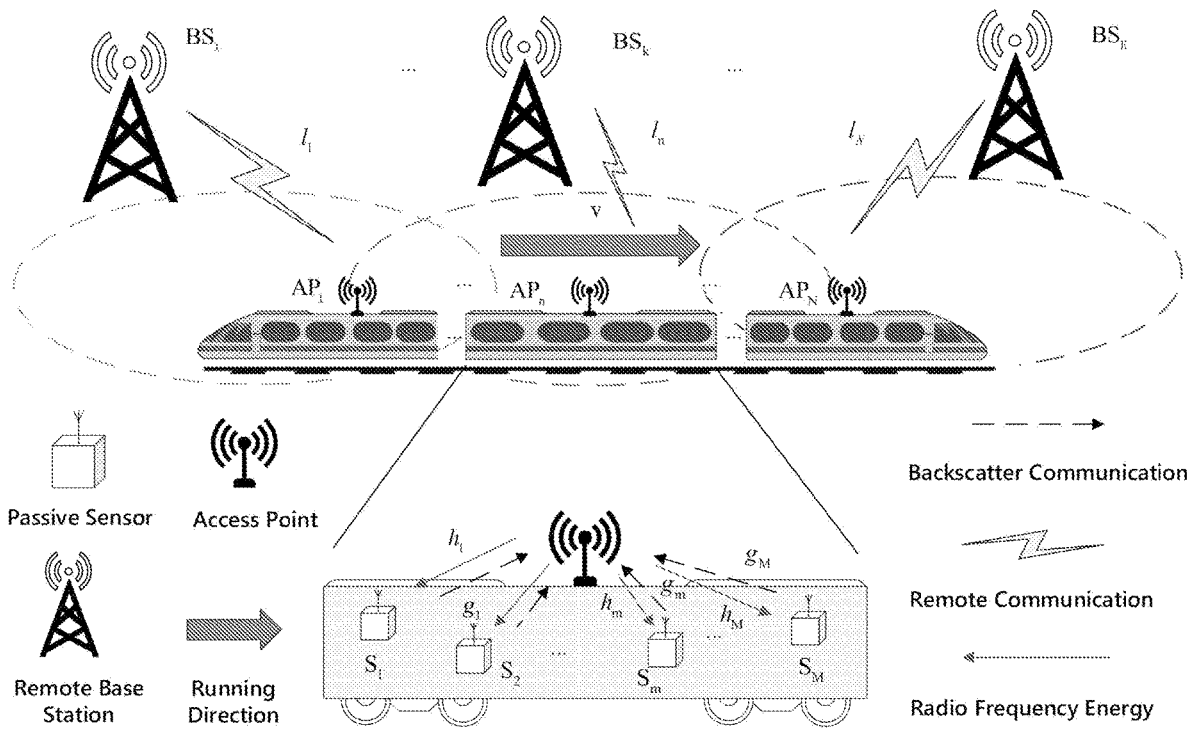
FIG. 2 is a schematic diagram of an integrated self-powered passive sensing and communication interactive model of the high-speed train based on HDRL provided by embodiments of the present invention.

Embodiments of the present invention disclose a self-powered integrated sensing and communication interactive method of the high-speed train based on hierarchical deep reinforcement learning (HDRL), as shown in FIG. 1, which comprises the following specific contents:

S1: Constructing an integrated system framework for self-powered passive sensing and communication of high-speed trains, which includes high-speed train carriages and base stations (BSs) for communicating. High-speed train carriages comprise an access point (AP) structure and a passive sensor structure. The former is mainly used for receiving train status information and communicating remotely with BS described before. The latter functions include harvesting wireless radio frequency (RF) energy from the AP and sending sensed train status information to the AP.

S2: Establishing an information sensing and remote communication model, which consists of a RF energy harvesting model for passive sensors, an information sensing model for train APs, and a remote communication model between the AP and the BS. The gaussian mixture model (GMM) clustering method is utilized to divide the remote communication handover triggering area and obtain reference handover triggering points. Handover of BS that communicates with the AP occurs in these reference points during the moving of high-speed trains.

S3: Formulating the integrated optimization problem: Establishing a joint optimization model with task completion time minimization as the objective function. Training the joint optimization model by applying the HDRL algorithm, so as to solve the optimal configuration of the system framework and acquire the optimal interaction policy. The task completion time includes: the time duration that passive sensors harvests energy, the time duration that the AP senses information and the time duration that the AP communicates with the remote BS. In conclusion, the joint optimization model represents the dynamic autonomous switching process of energy transmission, information sensing and remote communication.

In embodiment S1, constructing an integrated system framework for passive sensing and communication of high-speed trains, which includes high-speed train carriages and BSs for communicating with high-speed trains remotely. High-speed train carriages comprise an AP for transmitting RF energy, sensing information and communicating with the BS and passive sensors without batteries. Each sensor first collects RF energy from the AP for sensing train status information, and then the AP senses the train status information through low-power backscatter communication technology. In the process of remote communication between the AP and the BS, the reference handover triggering point is obtained based on the GMM clustering method to complete the communication handover during the operation of the high-speed train. The scenario assumed by the present invention has practical reference value.

In embodiment S2, Establishing an information sensing and remote communication model:
(1) Information Sensing Model The AP sends the unit power RF signal to the sensor at transmission power $p_m$, and the sensor receives the energy signal as:

$$y_{S,m} = \sqrt{p_m} h_m e_m + n_s$$

where $e_m$ is the energy signal, $h_m$ is the downlink channel gain from the AP to the sensor, $n_s$ is the noise, which follows the circularly symmetric complex Gaussian (CSCG) distribution.

After the sensor receiving the RF signal, the RF energy is used to charge its own circuit and acquire the sensor data. In a high-speed railway system, the nonlinear energy harvesting model can be expressed as:

$$P_{H,m} = \frac{\phi_m - P_{max}\chi_m}{1 - \chi_m}|h_m|^2$$

where $P_{H,m}$ denotes the power of the nonlinear energy harvesting model, $$\chi_m = \frac{1}{1 + e^{ab}}$$

is auxiliary variable, $$\phi_m = \frac{P_{max}}{1 + e^{-a(p_m - b)}}$$

is auxiliary function, a and b are parameters characterized by the circuit, and $P_{max}$ is the maximum transmission power.

After the completion of sensor's data acquisition, the AP applies backscatter communication technology for the information sensing of data collected by the sensor, and the sensing signal received at the AP is denoted as:

$$y_{A,m} = \sqrt{\alpha_m} \sqrt{p_m} g_m h_m e_m x_m + n_A$$

where $\alpha_m$ is the backscatter proportion, $x_m$ is the collected data signal at the sensor, and $g_m$ is the uplink channel gain from the sensor to the AP. $n_A$ is the circuit noise, which follows the CSCG distribution. $\sigma_A^2$ refers to the noise power, the $n_s$ term is neglected by comparison, since the noise at the sensor is negligible for the lower power consumption. The transmission rate for the sensing signal received at the AP can be formulated as:

$$r_{A,m} = B\log_2\left(1 + \frac{\alpha_m p_m |g_m|^2 |h_m|^2}{\sum\limits_{=1,\neq m}^{M} p_m |h_m|^2 + \sigma_A^2}\right)$$

where B is the channel bandwidth, and $p_m|h_m|^2$ denotes the interference from other sensors to the AP.

(2) Remote Communication Model

During the high-speed train operation, the AP needs to maintain communication with the BS. The communication signal received by the BS can be given by:

$$y_{B,n} = \sqrt{p_n} l_n z_n + n_B$$

where $z_n$ is the unit power information signal transmitted by the AP, $p_n$ refers to the transmission power of the AP. In addition, $n_B$ is the BS's noise, which follows the CSCG distribution, $\sigma_B^2$ is the noise power. The channel gain $l_n$ between the BS and the AP under the high-speed railway communication scenario can be denoted as:

$$l_n = \zeta \exp(-j2\pi f_c \tau_{LOS})$$

where $\zeta$ stands for larger-scale fading coefficient, and $f_c$ is the carrier frequency. $\tau_{LOS} = \|D_{Tx} - D_{Rx}\|/c$ refers to the arrival time of the LOS link, $\|g\|$ is 2-Norm function, $D_{Tx}$ and $D_{Rx}$ represent the real-time position between the AP and the BS. c is the lightspeed. $D_{Tx}$ is related to the initial position, running speed and operation time of the high-speed train.

In order to effectively evaluate the communication condition between the AP and the BS, it is necessary to study the transmission rate of the BS when receiving signals from the AP:

$$r_{B,n} = B\log_2\left(1 + \frac{p_n |l_n|^2}{p_{ICI}|l_n|^2 + \sigma_B^2}\right)$$

where $P_{ICI}|l_n|^2$ denotes the inter-channel interference. Due to that the ICI power caused by the Doppler shift is not coordinated among different subcarriers, we only consider its average impact and treat it as a part of white noise.

To meet the requirements of high-quality wireless communication services during the operation of high-speed train, the present invention proposes to analyze the communication handover triggering area with GMM so as to derive the reference handover triggering point in advance. The Gaussian mixture model, which consists of multiple Gaussian models, can be used to describe the probability distribution of the reference handover triggering point. Assuming that the received signal transmission rates of all BSs are composed of K Gaussian distribution hybrid vectors with given parameters, i represents the index of the location. The Gaussian mixture probability density function is expressed as:

$$f(r_i; \Theta) = \sum_{k=1}^{K} \zeta_k N(r_i \mid \mu_k, \Sigma_k)$$

where $N(r_i \mid \mu_k, \Sigma_k) = \dfrac{\exp\left(-\dfrac{1}{2}(r_i - \mu_k)^T \Sigma_k^{-1}(r_i - \mu_k)\right)}{2\pi|\sum_k|^{\frac{1}{2}}}$ is the Gaussian density function, $\Theta = \{\mu_k, \Sigma_k, \zeta_k\}$ is the position data sequence and model parameters, in which $\zeta_k$ is the weight obeying $$\sum_{k=1}^{K} \zeta_k = 1,$$

$\mu_k$ and $\Sigma_k$ are the mean and covariance vector of Gaussian distribution hybrid vector $r_i$, respectively.

Supposing the training signal set obtained by sampling is $R = \{r_1, r_2, \ldots, r_i, \ldots, r_I\}$ and the log-likelihood function of the training signal is:

$$L(\mu_k, \Sigma_k, \zeta_k) = \sum_{i=1}^{I} \ln\left[\sum_{k=1}^{K} \zeta_k N(r_i \mid \mu_k, \Sigma_k)\right]$$

For a given training signal set and the communication area number, the parameters $\Theta = \{\mu_k, \Sigma_k, \zeta_k\}$ are estimated by maximizing the log-likelihood function utilizing an expectation maximization (EM) algorithm. The handover communication range of the AP and the BS is divided based on the clustering results of the Gaussian mixture model. The present invention sets the position of the train's starting point as the initial value for the update of the GMM algorithm. It calculates the predicted value and its distribution by fitting the relationship between transmission rate, speed and time. In the update process, the train reports a set of data rates, and then calculates a handover triggering point and updates its distribution. Finally, the result can be used as prior information for the next update calculation. The location of each handover triggering area center is determined by the parameter $\mu_k$. The reliability of the predicted value is determined by the covariance $\Sigma_k$ represented by the shape and size of the handover triggering area.

In embodiment S3, Combining the time duration $$\tau_m^c$$

that passive sensors harvesting energy, the time duration $$\tau_m^d$$

that the AP sensing information, and the time duration $$\tau_n^r$$

that the AP communicates with the remote BS to formulate the integrated optimization problem based on the integrated system framework for passive sensing and communication of high-speed train. To solve the optimal configuration of the system framework and acquire the optimal interaction policy, the goal is to minimize the total task completion time under the multiple constraints of information sensing rate, remote transmission rate and energy consumption.

$$\min_{\tau_m^c, \tau_m^d, \tau_n^r} \tau_m^c + \tau_m^d + \tau_n^r$$

$$\text{s.t. } C1: r_{A,m}(\tau_m^d) \geq r_{A,min},$$

-continued $$C2: r_{B,m}(\tau_n^r) \geq r_{B,min},$$

$$C3: E_n^{total} - E_{T,n}(\tau_m^c) - E_{C,n}(\tau_n^r) > 0,$$

$$C4: E_{H,m}(\tau_m^c) \geq E_{C,m}.$$

where C1, C2, C3, and C4 are constraints, C1 denotes the AP information sensing rate constraint, to ensure that the AP successfully senses the train state information, $r_{A,m}$ is the AP information sensing rate, $r_{A,min}$ is the lower bound of the AP information sensing rate; C2 denotes the AP remote transmission rate constraint, to ensure the remote communication between the AP and the BS, $r_{B,m}$ is the AP remote transmission rate, $r_{B,min}$ is the lower bound of the remote transmission rate; C3 denotes the energy constraint of the AP to guarantee that the AP operate properly, $$E_n^{total}$$

is the total energy value of the AP, $E_{T,n}$ is the energy consumed by the AP to charge the sensor, $E_{C,n}$ is the energy consumed by remote communication of the AP; C4 denotes the energy consumption constraint of the sensor, the energy harvested by the sensor should ensure the stable operation of the sensor, $E_{H,m}$ is the energy harvested by the passive sensor, is the energy consumed by data acquisition of the passive sensor.

In embodiment S3, the option-based HDRL algorithm applies a SMDP to simulate a high-speed train sensing and communication scenario, including state sets, action sets, option sets, transition probability, total reward and reward discount factor; The high-speed train AP, as a single agent, can learn policy based on options. The AP selects an option based on its initial state at the beginning of the task and then executes the action according to the policy of the selected option. At the moment when the option ends and reaches the total reward for the selected option, the agent chooses the option to be executed according to the policy based on the state information until the end of the task.

It is worth noting that in a conventional Markov decision process (MDP), the system needs to choose actions when the system state changes. However, in option-based HDRL, the state may change several times between two decision epochs, while only the state at the decision epoch is relevant to the system.

Compared with the conventional MDP, embodiments of the present invention utilize a semi-Markov decision process (SMDP) to simulate a high-speed railbus sensing and communication scenario, and the SMDP contains six tuples <S, A, O, P, R, γ>, where S, A and O represent the set of states, actions and options, respectively. P is the transition probability set, R is the total reward set, γ is the reward discount factor. As a single agent, the high-speed train AP can learn policy based on the selected option. The AP selects an option $o_0$ based on its initial state $s_0$ at the beginning of the task and then executes the action according to the policy π of selected option $o_0$. At the moment t when the option $o_0$ ends and reaches the total reward $R_t$ for the selected option, the selected option $o_t$ is executed according to the policy ω based on the state information $s_t$, and so on until the end of the task.

In this embodiment, the state of each AP in high-speed railbus includes four components, i.e., S={$S_1$, $S_2$, $S_3$, $S_4$}. More in detail, $S_1$ is the set of remote communication connection probability, B={$B_1$, . . . , $B_n$, . . . , $B_N$}∈ $S_1$ are the probability vectors, and $B_n$∈ [0,1] refers to the connection probability to the corresponding BS; $S_2$ is the set of trains location, which is related to the two-dimensional coordinates of the remote communication link. $S_3$ is the set of remaining energy of each sensor, $S_4$ is the set of information sensing state from the AP to the sensor m, i.e., D={$D_1$, . . . , $D_m$, . . . , $D_M$}∈ $S_4$, $D_m$ ∈ [0,1] is the data acquisition ratio.

In this embodiment, the AP action set A contains three basic actions: energy transmission from the AP to the sensor $A_c$, the AP information sensing $A_d$ and the remote communication between the AP and the BS $A_r$.

In this embodiment, the set of options O executed by the high-speed train AP contains three options: information sensing $o_d$, energy transmission $o_c$ and remote communication $o_r$, i.e., O={$o_r$, $o_d$, $o_c$}, where $o_d$={$o_1$, . . . , $o_m$, . . . $o_M$} indicates that the AP senses information from the sensor m; $o_c$ denotes the AP transmits energy to the sensor; and $o_r$={$o_1$ . . . , $o_n$, . . . $o_N$} denotes the AP communicates with the BS remotely. Each option can be considered as a series of actions in general, all in three tuples <I, π, β>, and the set of options that can be selected by the AP in any state is within the set of options O, i.e., I=S. In the present invention, the intra-option policy for selecting actions is set as a known determined policy π, and the termination condition for any option is that the system finishes all the actions.

Specifically, for the option of information sensing $o_d$, the policy is that the AP collects data from the sensor via backscatter communication until the data acquisition is completed and end of the current option; For the option of energy transmission $o_c$, the policy is that the AP charges the sensor using the RF signal in the form of broadcast communication until the power is fully charged and the current option ends; For the option of remote communication $o_r$, the policy is that the AP communicates with the BS remotely until the completion of handover and the current option is finished. In the simulation operation, the intra-option policy for selecting actions does not need to be trained.

The total reward $R_t$ of each option is obtained by the AP at the end time t of corresponding option. $R_t$ is a function of the initial state $s_t$ and action $s_r$. Supposing that the total reward of the option is divided into the energy remaining reward $R_E$, the information sensing reward $R_D$ and the remote communication reward $R_T$. The energy remaining reward $R_E$ is for punishing the operation out of battery situation of the sensor, i.e., $$R_E = \begin{cases} \varphi_E, & E_r \leq 0, \\ 0, & \text{otherwise} \end{cases}.$$

where $\varphi_E$ is a negative constant, $E_r$ represents the remaining energy. The information sensing reward $R_D$ is used for punishing the AP for the repeated selection of a passive sensor that has completed acquisition, which can be given by $$R_D = \begin{cases} \varphi_D, & D_m = 1, \\ 0, & \text{otherwise} \end{cases}.$$

where $\varphi_D$ is a negative constant, the remote communication reward $R_T$ is used to punish the AP for repeatedly selecting a BS that has completed communication handover.

$$R_T = \begin{cases} \varphi_T, & B_n = 1, \\ 0, & \text{otherwise} \end{cases}.$$

Ultimately, the total reward for an agent after an option is the sum of the above three rewards, i.e., $R_t = R_E + R_D + R_T$.

In the embodiment, based on the Deep Q-Network (DQN) framework, an option-based HDRL algorithm is used for training high-speed train in order to find the optimal policy to solve the ISAC problem. The high-speed train ends from the previous option $o_{t-1}$ during the interaction with environment, and receives the corresponding reward $R_{t-1}$ and the next step status information $s_t$. Input the current state information $s_t$ into the option-value neural network which have one input layer, five hidden layers and one output layer. Hidden layers include five fully connected layers, the first fully connected layer contains 1024 neurons and the Rectified Linear Unit (ReLU) function is employed as an activation function. The output of the first layer is:

$$X_1 = ReLU(W_1^T s_t + b_1)$$

where $W_1$ is the weight parameter of the first layer, $b_1$ is the bias parameter. The input of the second hidden layer is the output of the first hidden layer, the second fully connected layer contains 512 neurons and the ReLU function is employed as an activation function similarly. The output of this layer is:

$$X_2 = ReLU(W_2^T X_1 + b_2)$$

where $W_2$ is the weight parameter of the second layer, $b_2$ is the bias parameter. The input of the third hidden layer is the output of the second hidden layer, the third fully connected layer contains 256 neurons and the ReLU function is employed as an activation function similarly. The output of this layer is:

$$X_3 = ReLU(W_3^T X_2 + b_3)$$

where $W_3$ is the weight parameter of the third layer, $b_3$ is the bias parameter. The input of the fourth hidden layer is the output of the third hidden layer, the fourth fully connected layer contains 128 neurons and the ReLU function is employed as an activation function similarly. The output of this layer is:

$$X_4 = ReLU(W_4^T X_3 + b_4)$$

where $W_4$ is the weight parameter of the fourth layer, $b_4$ is the bias parameter. The input of the fifth hidden layer is the output of the fourth hidden layer, the fifth fully connected layer contains 64 neurons and the ReLU function is employed as an activation function similarly. The output of this layer is:

$$X_5 = ReLU(W_5^T X_4 + b_5)$$

where, $W_5$ is the weight parameter of the fifth layer, $b_5$ is the bias parameter. The output layer accepts the output of the fifth layer and uses the softmax activation function to output the 0-dimensional vector o:

$$o = \text{softmax}(W_6^T X_5 + b_6)$$

where, $W_6$ and $b_6$ are the weight parameter and the bias parameter, respectively. Softmax is the normalized exponential function. The output of option-value neural network $Q^{option}$ is the option probability, i.e., $$\sum_{j=1}^{O} p_{o_j} = 1.$$

The optimal option is computed by using the $\varepsilon$-greedy algorithm, $\varepsilon$ is a smaller value between 0 and 1, chosen randomly with probability $\varepsilon$ each time and with probability $1-\varepsilon$ using the greedy algorithm, i.e., the index of the largest value is selected as the option $o_t$, $\varepsilon$-greedy is expressed as $$o_t = \underset{j}{\text{argmax}}(o_j)$$

Selecting the policy $\pi$ and termination condition $\beta$ corresponding to $o_t$ from the option sets and interacting with the environment continuously.

In the training of the option-based HDRL algorithm, a high-speed train experience replay buffer $D = \{s_t, o_t, R_t, s_{t+1}\}$ is set, where $s_t$ denotes the current state, $o_t$ represents the option action obtained according to the current algorithm, $R_t$ is the total reward and $s_{t+1}$ represents the next state to which the system is transferred after the transition probability P. The option-value neural network $Q^{option}$ is trained by applying experience replay and experience random sampling. The option-value neural network $Q^{option}$ in the algorithm, also known as the evaluation network, sets the target-value network $Q^{target}$ to express the optimal evaluation network $Q^{option*}$ approximately. The loss function of the evaluation network is expressed as $$\text{Loss}(\theta) = E[R_t + \gamma \text{ arg max } Q^{target}(s_{t-1}) - Q^{option}(s_t, o_t; \theta)]^2$$

The above equation E denotes the expectation function in the experience replay buffer D, and $\theta$ represents all parameters in the option-value neural network $Q^{option}$, which can be updated by:

$$\theta_{new} = \theta_{old} - \kappa \nabla_\theta \text{Loss}(\theta)$$

where $\kappa$ is the learning rate, $\theta_{new}$ and $\theta_{old}$ denote the parameters after and before the update of the option-value network, respectively. The gradient of the loss function $\nabla_\theta \text{Loss}(\theta)$ can be expressed as $$\nabla_\theta \text{Loss}(\theta) = E[2(\text{arg max } Q^{target}(s_{t+1}) + R_t - Q^{option}(s_t, o_t; \theta)) \times \nabla_\theta Q^{option}(s_t, o_t; \theta)]$$

The target-value network is updated by using the parameters of the original target-value network and the current estimated network periodically, with the following updating rule:

$$\theta_{new}^{target} = \rho\theta_{old}^{target} + (1 - \rho)\theta$$

where $\rho$ is the updating rate and $\rho \in [0, 1]$, $$\theta_{new}^{target} \text{ and } \theta_{old}^{target}$$

denote the parameters target after and before the update of the target-value network $Q^{target}$, respectively.

Figure 3:
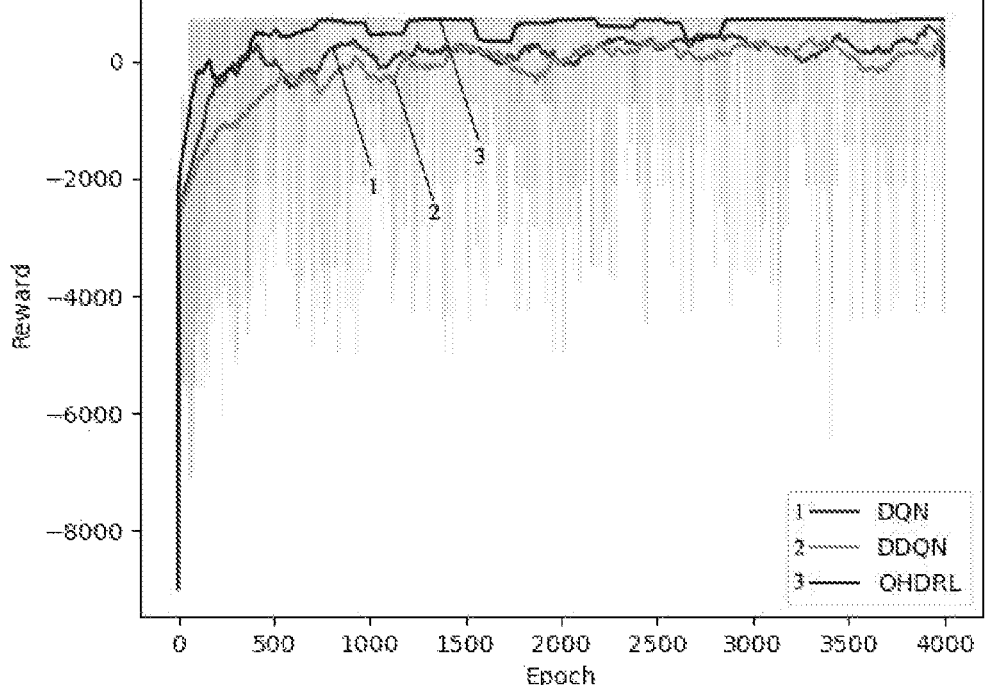
FIG. 3 is a simulation result of the periodic reward of the option-based HDRL algorithm and conventional DQN algorithms provided by embodiments of the present invention.

FIG. 3 illustrates the simulation results of the training period reward of the option-based HDRL algorithm provided in this embodiment. Compared with the conventional DQN algorithm, the period reward of the option-based HDRL algorithm rises more rapidly and converges quickly, while the period reward of the conventional DQN algorithm converges more slowly and fluctuates more and its final period reward is significantly lower than that of the former. It indicates that the proposed option-based HDRL algorithm utilizes a direct learning strategy, which can learn the meaning of the scenario faster than the conventional DQN algorithm, therefore more suitable for a highly-dynamic scenario of high-speed train; in contrast, the conventional DQN algorithm selects only the basic actions every time, which lacks the overall consideration of a highly-dynamic scenario.

The above provides a detailed description of a self-powered integrated sensing and communication interactive method of high-speed railway based on HDRL, and specific examples are applied in this embodiment to elaborate the principle and implementation of the invention. The above description is only for helping to understand the method of the invention and its core idea; at the same time, for the general technical person in the field, according to the idea of the present invention, there will be changes in the specific implementation and application scope. In summary, the contents of this specification should not be construed as a limitation of the invention.

The above description of the disclosed embodiments enables those skilled in the art to realize or use the present invention. Many modifications to these embodiments will be apparent to those skilled in the art. The general principle defined herein can be realized in other embodiments without departing from the spirit or scope of the present invention. Therefore, the present invention will not be limited to these embodiments shown herein, but will conform to the widest scope consistent with the principle and novel features disclosed herein.

What is claimed is:

1. A self-powered integrated sensing and communication (ISAC) interactive method of a high-speed train based on hierarchical deep reinforcement learning (HDRL), comprising the following steps:

constructing an integrated system framework for passive sensing and communication of the high-speed train, wherein the integrated system framework comprises high-speed train carriages and base stations (BSs) in remote communication with the high-speed train carriages, the high-speed train carriages each comprise an access point (AP) and passive sensor, the passive sensors are configured for harvesting wireless radio frequency (RF) energy from the AP and transmitting sensed train state information to the AP, and the AP is configured for receiving the train state information and communicating remotely with the BSs;

establishing an information sensing and remote communication integrated model, wherein the information sensing and remote communication integrated model consists of a RF energy harvesting model for the passive sensors, an information sensing model for the train APs and remote communication model between the APs and the BSs, the information sensing and remote communication integrated model is configured for using a gaussian mixture model (GMM) clustering method to divide a remote communication handover triggering area and obtain reference handover triggering points, such that the high-speed train carriages can change the BSs in communication with the APs in the reference handover triggering points during moving of the high-speed train; and formulation of an integrated optimization problem: establishing a joint optimization model with task completion time minimization as an objective function, training the joint optimization model by applying an option-based HDRL algorithm, and solving an optimal configuration of the integrated system framework to acquire an optimal interaction policy, where the task completion time comprises time duration for the passive sensors harvesting energy, time duration for the the AP sensing information and time duration for the AP communicating with the corresponding remote BS, and the joint optimization model represents a dynamic autonomous switching process of energy transmission, information sensing and remote communication of the high-speed train carriages.

2. The self-powered ISAC interactive method according to claim 1, wherein establishment of a nonlinear energy harvesting model for the passive sensors comprises:

constructing an energy signal model received by the passive sensors, based on a process of the AP sending RF signals of given unit power to the passive sensors under given transmission power, and after receiving the RF signals, the passive sensors using RF energy to charge their own circuits and then establish the nonlinear energy harvesting model for the passive sensors; and establishment of the information sensing model for the train APs:

After completion of data acquisition by the passive sensor, the AP using backscatter communication technology to sense information of data acquired by the passive sensors, and building an information sensing signal model received by the AP and proposing a transmission rate model of the signal.

3. The self-powered ISAC interactive method according to claim 1, wherein establishment of the remote communication model between the APs and the BSs comprises:

constructing a transmission rate model of the BSs when receiving signals from the APs;

forming a Gaussian mixture model by making multiple Gaussian distribution hybrid vectors with given parameters constitute transmission rates of signals received by the BS, wherein the Gaussian mixture model is configured for describing probability distribution of the reference handover triggering points, and dividing a communication handover range of the AP and the BS based on clustering results of the Gaussian mixture model; and fitting relationship between the transmission rate, speed and time to obtain a prediction, value and corresponding distribution of the reference handover triggering points, wherein the prediction value of a current reference handover triggering point prediction is used as priori information for next update calculation; a location of each communication handover triggering area center is determined by a mean vector of the Gaussian distribution hybrid vectors that comprises the transmission rate, and reliability of the prediction value is determined by a covariance vector of the Gaussian distribution hybrid vectors that comprises the transmission rate and is represented by a shape and a size of the communication handover triggering area.

4. The self-powered ISAC interactive method according to claim 1, wherein the option-based HDRL algorithm applies a semi-Markov decision process (SMDP) to simulate a sensing and communication scenario of the high-speed train, comprising state sets, action sets, option sets, transition probability, total reward and reward discount factor; and the AP of the high-speed train, as a single agent, learns a policy based on options, and selects an option based on own initial state at beginning of a task, the AP executes an action according to the policy of the selected option, reaches total reward for the selected option at a moment when the option ends, then chooses a to-be-executed option according to the policy based on the state information, and so on until the end of the task.

5. The self-powered ISAC interactive method according to claim 4, wherein the state sets of the AP of the high-speed train comprise: remote communication connection probability, high-speed train position, remaining energy of the sensor and percentage of information sensed by the AP from the sensor; the action sets comprise three actions: energy transmission from the AP to the sensor, information sensing by the AP, and remote communication between the AP and the BS; and the option sets comprise three options: information sensing, energy transmission and remote communication, wherein the total reward of the options is divided into three categories: energy remaining reward, information sensing reward and remote communication reward.

6. The self-powered ISAC interactive method according to claim 4, wherein the AP of the high-speed train receives the total reward for each option at an end moment of the option, and the total reward is a function of an initial state of the option and an option action, wherein the energy remaining reward is used for punishing a working condition of insufficient power during execution of the option, the information sensing reward is used for punishing the AP for repeated selection of a passive sensor that has completed the acquisition, and the remote communication reward is used for punishing the AP for repeatedly selecting a BS that has completed communication handover.

7. The self-powered ISAC interactive method according to claim 4, wherein the option-based HDRL algorithm first inputs current state information into an option-value neural network, and correspondingly output an option probability; then the agent derives an optimal option by comparing an index of values obtained from random selection and greedy algorithms; and finally the agent outputs a corresponding action according to the policy and termination condition of the selected option.

8. The self-powered ISAC interactive method according to claim 7, wherein the option-value neural network of the option-based HDRL algorithm has one input layer, five hidden layers and one output layer, the input layer receives state information and option rewards, the hidden layers comprise five fully connected layers, a Rectified Linear Unit (ReLU) is employed for all the hidden layers as an activation function, and a Softmax normalized exponential function is employed for the output layer to obtain the option probability.

9. The self-powered ISAC interactive method according to claim 7, wherein the option-value neural network of the option-based HDRL algorithm is trained by using experience random sampling and experience replay, and the updating of parameters of the option-value neural network is completed by computing a gradient of a loss function.

* * * * *